March 12, 1963 — A. RAND — 3,080,709
AFTERBURNER FUEL AND NOZZLE AREA CONTROL
Filed Oct. 26, 1960 — 2 Sheets-Sheet 1
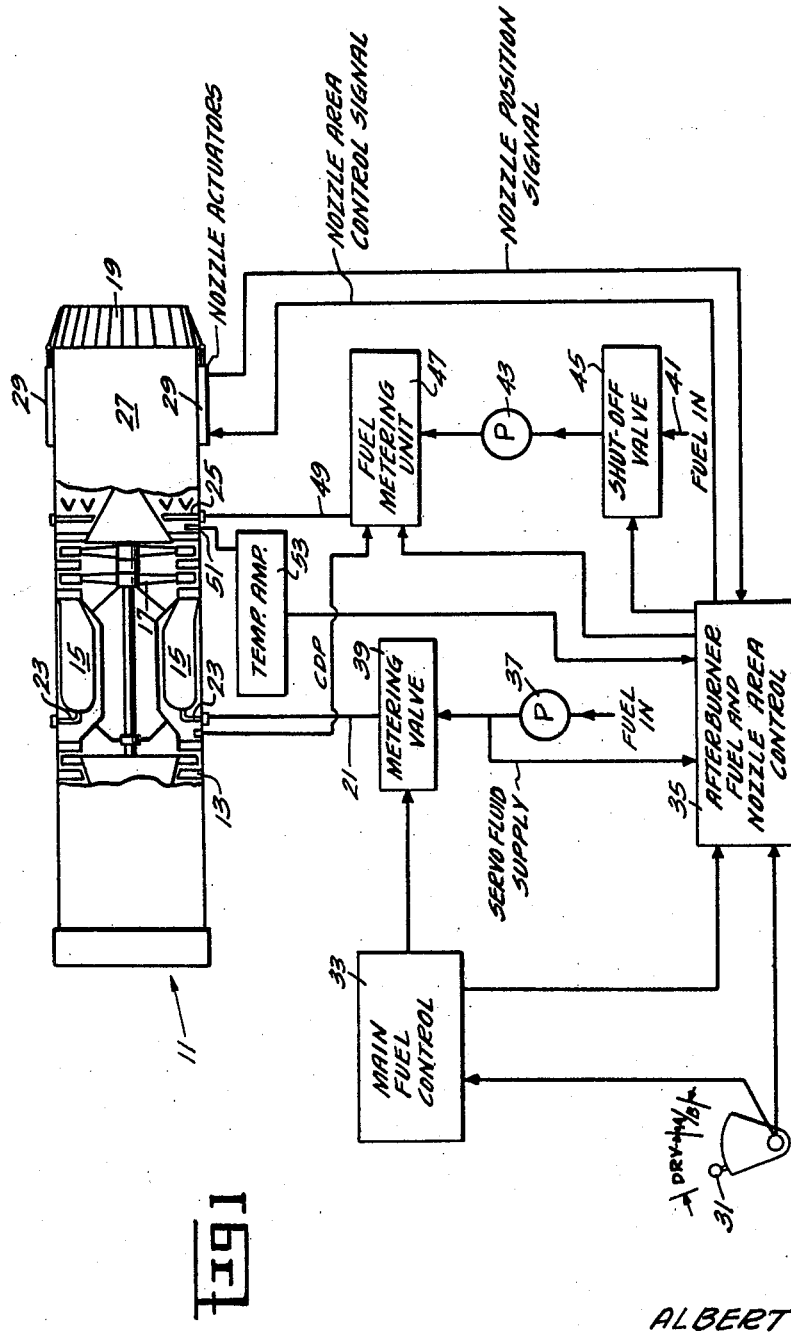
INVENTOR.
ALBERT RAND
BY
Carl Baker
ATTORNEY

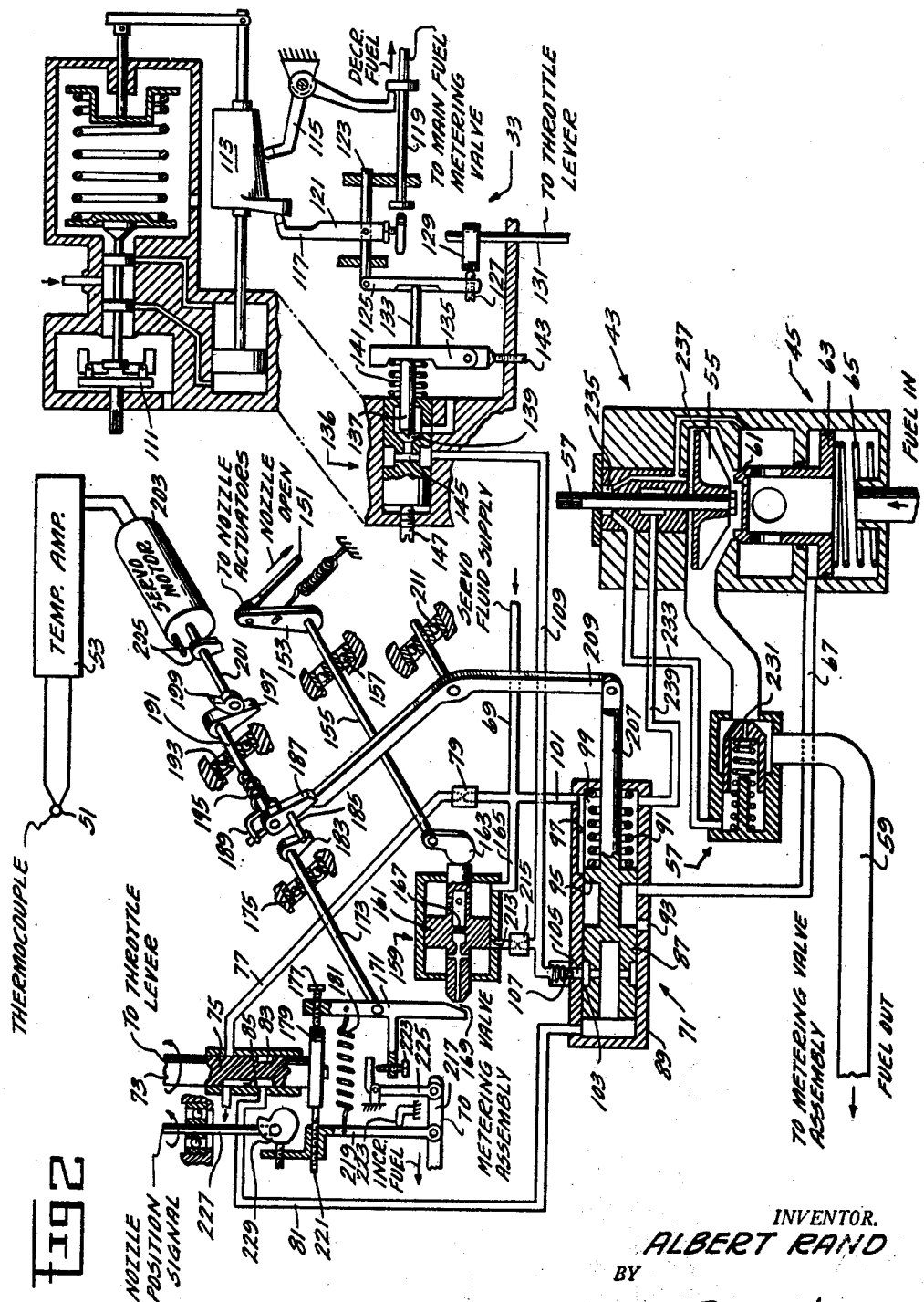

United States Patent Office 3,080,709
Patented Mar. 12, 1963

3,080,709
AFTERBURNER FUEL AND NOZZLE
AREA CONTROL
Albert Rand, Newton Center, Mass., assignor to General
Electric Company, a corporation of New York
Filed Oct. 26, 1960, Ser. No. 65,093
2 Claims. (Cl. 60—35.6)

This invention relates to control systems for gas turbine power plants and more particularly to control systems for aircraft gas turbine power plants including variable area nozzle and afterburner.

In the design of gas turbine power plants, particularly those for use in high performance aircraft, it often is desired to augment engine thrust during short periods of time such as at take-off. Commonly such thrust augmentation is obtained by burning additional fuel in the engine tailpipe, in burner structure termed an afterburner. Such afterburning does not directly affect the temperature of the gas discharged at the turbine since afterburning occurs some distance downstream. However, assuming a fixed area jet nozzle, the increase in gas temperature in the tailpipe caused by afterburning is accompanied by a proportionate increase in pressure of the gas in the tailpipe. This results in a decrease in the pressure drop across the turbine which tends to reduce the turbine speed.

Since aircraft gas turbines commonly are provided with speed governors, the decrease in turbine speed will cause the governor to increase the fuel flow to the engine main burners so as to return the turbine speed to the desired value. Such increase in fuel flow to the engine main burners produces a proportionate increase in the temperature of the gas passing through the turbine and this high gas temperature at the turbine may be detrimental to the turbine structure. It therefore is desirable to provide means for insuring that turbine temperature does not exceed the predetermined safe level during afterburning.

It has been found that turbine temperature can be controlled by varying the area of the jet nozzle. Increasing the area of the nozzle reduces the pressure of the gas in the tailpipe, thus reducing the back pressure on the turbine, which in turn produces a tendency for the turbine to accelerate with a resultant reduction in fuel flow to the engine main burners by action of the speed governor. Thus, turbine temperature is maintained at the proper level with an augmented thrust level, however, being produced by reason of the afterburning in the tailpipe.

It has been found desirable to manually schedule the jet nozzle area and engine speed during "dry" or unaugmented operation so that the jet nozzle is wide open when the engine is initially started and is then gradually closed as the speed is increased until it is fully closed at the maximum unaugmented speed, to thus obtain maximum unaugmented thrust. During augmented operation, increase in afterburner fuel flow is accompanied by the above-explained tendency for turbine temperature to exceed the safe level, necessitating that the jet nozzle be opened to maintain the actual turbine temperature at the desired level.

To accomplish this, the manual scheduling of jet nozzle area is relinquished to automatic control means operative to vary the jet nozzle area in accordance with turbine temperature, to insure that this temperature does not exceed the predetermined safe limit during afterburning. In event the nozzle reaches full open position and overtemperature still exists, then the turbine temperature limit mechanism may transfer its control to the afterburner fuel metering unit and modulate afterburner fuel flow as necessary to hold turbine temperature at the desired level. Additionally, to obtain more rapid engine acceleration during "dry" engine operation as well as more rapid restoration of engine speed after deceleration due to initiation of afterburner fuel combustion, means are provided for automatically effecting opening movement of the nozzle to a predetermined open position whenever such under-speed condition exists, regardless of the nature of the cause of the under-speed.

The present invention is directed to afterburner fuel and nozzle area control systems as just described, and has as a primary object the provision of new and improved systems of this type. It is also an object of the invention to provide afterburner fuel and nozzle area control systems which perform to optimize engine performance during both "dry" and afterburning operation by integrating the control of nozzle area and afterburner fuel supply in a manner to accommodate their operation to the widely differing conditions encountered particularly in transition between afterburning and non-afterburning modes of operation.

Another object of the invention is the provision of afterburner fuel and nozzle area control systems incorporating fail-safe features affording improved reliability of operation. Still another object of the invention is the provision of afterburner fuel and nozzle area control systems characterized by relative simplicity of construction and consequent economy of manufacture.

The invention in one preferred embodiment comprises an afterburner fuel and nozzle area control system for use with a throttle lever controlled turbojet engine including afterburner and variable area nozzle. The control system includes first control means normally operative to schedule engine nozzle area as a function of throttle lever position. A second control means operative in response to an engine operating parameter such as turbine temperature exercises override control of nozzle area when the operating parameter is beyond a predetermined limit. The system also includes an afterburner fuel control means, and means responsive to its operation to limit the action of the override control except during afterburner operation.

These and other objects, features and advantages of the invention will become apparent and the invention further understood by reference to the appended claims and the following detailed description when read in conjunction with the accompanying drawings, wherein:

FIGURE 1 illustrates schematically a turbojet engine including an afterburner and variable area nozzle and equipped with control means in accordance with the invention, and FIGURE 2 is a schematic diagram of the afterburner fuel and nozzle area control of FIGURE 1.

With continued reference to the drawings, wherein like reference numerals have been used throughout to designate like elements, an aircraft turbojet engine including an afterburner and variable area nozzle is designated generally by reference numeral 11 in FIGURE 1. As there shown, the engine comprises a compressor 13 providing high pressure combustion air to a plurality of combustion chambers 15 the combustion gases from which discharge through a turbine 17 to drive the compressor, and then exhaust through the engine nozzle 19 to provide propulsive thrust. Fuel supply to the engine main combustion chambers 15 is through a line 21 connected to supply fuel to nozzle elements 23 each of which is arranged to eject fuel into the combustion chamber 15 in which mounted.

The engine 11 is equipped with an afterburner fuel manifold as shown at 25 arranged to eject a spray of fuel into the engine tailpipe 27 downstream of turbine 17, with this supplementary fuel providing thrust augmentation during periods when maximum thrust output is required, as for example during take-off. With an engine thus equipped for afterburning operation, controlled variation of the engine nozzle exit area is desirable in order to obtain efficient operation under the widely varying conditions which exist during afterburning and non-afterburning or "dry" operation. To this end, the exhaust nozzle 19 of the engine is provided with means such as the flap elements shown for varying the effective exit area of the nozzle. Such nozzle area varying means are well known in the art and require no discussion except to note that movement of the nozzle area varying elements is by operation of one or more actuators 29 connected to drive the nozzle in opening and closing directions in accordance with a control input signal.

Preferably though not necessarily a single throttle lever is provided to control operation of the entire engine, including control of its main fuel supply as well as of afterburner fuel supply and nozzle area. Such single lever control is illustrated in FIGURE 1 wherein the throttle lever 31 is shown linked to the engine main fuel control 33 for metering fuel to the engine main burners, and is shown linked to the afterburner fuel and nozzle area control unit 35 for controlling both the supply of afterburner fuel and operation of the nozzle actuators 29.

The engine main fuel supply and control system may be conventional except for inclusion of means providing an acceleration signal to the afterburner fuel and nozzle area control as hereinafter explained. The main fuel system includes a pump 37 which has its inlet connected to the aircraft fuel tanks and discharges through a metering valve 39 operative to control the rate of fuel flow to the engine main burners 15. This metering valve is under control of the main fuel control system 33, and this in turn is controlled by throttle lever 31 as previously mentioned. Typically the main fuel control system includes engine speed responsive means operative to hold engine speed constant at a speed setting scheduled by the throttle lever, though the afterburner fuel and nozzle area control of the present invention is not in any way limited to use with fuel controls operative in this particular manner.

The afterburner fuel supply system includes a supply line 41 connecting to the inlet of a pump 43 through a shut-off valve 45, with the pump connected to discharge through a metering valve assembly 47 into a line 49 connecting to the engine afterburner fuel manifold 25. Both the shut-off valve 45 and the metering valve 47 operate under control of the afterburner fuel and nozzle area control unit 35 in response to the various inputs to that unit. Among these are the throttle lever input previously mentioned, and a turbine temperature signal provided by a thermocouple or thermocouples 51 mounted in the engine tailcone just downstream of the turbine 17 so as to produce a turbine temperature signal which is amplified by temperature amplifier 53 before transmission to the afterburner fuel and nozzle area control unit, and a nozzle position signal which is supplied to the afterburner fuel and nozzle area control unit from the nozzle actuators and indicates present position of the nozzle.

With reference now to FIGURE 2, the afterburner fuel and nozzle area control unit 35 of FIGURE 1 is shown schematically, together with the afterburner fuel pump 43, the shut-off valve 45, and that portion of the main fuel control 33 which provides the necessary acceleration signal to the afterburner fuel and nozzle area control. The afterburner fuel pump 43 shown is of centrifugal type and includes an impeller 55 mounted to a shaft 57 which preferably but not necessarily is engine driven. The pump impeller 55 draws fuel in through the shut-off valve 45, and discharges through a check and drain valve assembly designated generally by reference numeral 57. The fuel then is ducted through a line 59 to the fuel metering unit 47 (FIGURE 1) and to the engine afterburner fuel manifold.

The shut-off valve 45 comprises a valve head 61 adapted to seat against the forward wall of the pump impeller chamber to thus seal off the pumping chamber from the inlet line. Valve head 61 is positioned by an actuator piston 63 which is loaded in valve closing direction by a compression spring 65 and may be driven in valve opening direction by fluid pressure in the space above the piston and within the cylinder in which it translates. The supply of pressure fluid to this space is through a line 67 which connects to the servo fluid supply line 69 through a lock-out valve assembly designated generally by reference numeral 71.

From FIGURE 1 it will be noted that the servo fluid supply for operating the shut-off valve actuator and energizing other elements of the afterburner fuel and nozzle area control is obtained by connection into the engine main fuel system just downstream of the engine main fuel pump 37. This is of advantage in that it avoids the necessity for a separate operating fluid supply and also in that it assures the availability of servo operating fluid whenever the engine is operating since the main fuel pump normally is directly geared to the engine.

The operation of lock-out valve assembly 71 is under control of the throttle lever 31 (FIGURE 1), with the throttle lever input to the control unit of FIGURE 2 being by rotation of a throttle shaft 73 shown at upper left in FIGURE 2. This shaft 73 has affixed thereto a pilot valve element 75 which controls fluid communication between an inlet line 77 connected to the servo fluid supply line 69 through a fixed orifice 79, and an outlet line 81 connecting into the lock-out valve assembly 71 to control operation thereof.

The spool element of pilot valve 75 has cut therein a circular groove 83 in open communication with the line 81, and a longitudinal slot 85 which opens into the groove 83 at one end and is adapted to overlie the port to line 77 at its other end. This slot 85 is so located and is of such width that it places the inlet and outlet lines 77 and 81 in fluid communication with each other whenever the throttle shaft 73 occupies an angular position corresponding to a throttle lever setting anywhere in the afterburner operating range, as indicated by the letters A/B in FIGURE 1.

Thus, whenever afterburner operation is called for by the throttle lever, a fluid pressure signal is transmitted from the servo supply line 69 through pilot valve 75 and line 81 to the lock-out valve assembly. As shown, this assembly comprises a valve piston 87 slidable within a cylinder 89 in response to unbalance between a leftward directed force provided by a loading spring 91 compressed between the piston and the cylinder end wall, and a rightward directed force provided by the fluid pressure signal communicated through line 81. This fluid pressure derived force substantially exceeds that of the applied force of spring 91, so that whenever pressure fluid is supplied through line 81 the valve piston 87 will move to the right.

As the valve piston moves, it first acts to block a port 93 through which the shut-off valve actuating line 67 connects to drain. As rightward movement continues, a land 95 on the valve piston uncovers a port 97 and, through this port, the shut-off valve actuating line 67 now connects to a chamber 99 formed within cylinder 89. This chamber 99 is maintained at servo fluid supply pressure through a line 101 connecting directly to the servo fluid supply line 69.

Thus, when the lock-out valve piston 71 completes its movement toward the right, responsive to a throttle lever input calling for afterburner operation, servo fluid at supply pressure may flow through lines 69 and 101, valve port 97 and line 67 to the cylinder space above the shut-off valve piston 63. The force loading thus imposed upon the piston will overcome the opposed force of spring 65 and cause the shut-off valve to move to full open position, permitting free flow of fuel to the afterburner fuel pump 43. In this fashion, operation of the shut-off valve and fuel pump is directly controlled by the throttle lever input in a manner such as to initiate afterburner fuel flow whenever called for by throttle lever setting.

This operation is subject to an override, however, which will now be explained. The valve piston 87 of lock-out assembly 71 has formed therein an annular groove 103 open through radial passages in the piston to the end of cylinder 89 to which the inlet line 81 connects. Groove 103 cooperates with a valve port 105 which is formed in the cylinder wall and opens through a check valve 107 to a line 109. This line connects into the main fuel control 33 a portion of which is shown at upper right in FIGURE 2. Preferably, but not necessarily, this main fuel control may be of the general construction shown in the co-pending application of William F. Marscher, Serial No. 65,104, filed on an even date herewith and assigned to the assignee of the present application.

As more fully explained in the Marscher application, the main fuel control comprises an engine speed sensor 111 operative to position a cam member 113 as a direct function of engine speed. Such positioning of cam 113 is accomplished through servo mechanism the details of which are not essential to understanding of the present invention; suffice it to say here that the servo acts to translate the cam 113 towards the left with increasing engine speed and towards the right with decreasing engine speed so that cam position accurately represents engine speed.

Cam 113 includes two camming surfaces one of which is engaged by a cam follower 115 to provide acceleration fuel flow limiting, the other is engaged by a follower 117 to provide steady-state speed control, with both these followers operating to perform their respective functions by control of translatory movement of a push rod 119 which connects to the engine main fuel metering valve (shown at 39 in FIGURE 1). Cam follower 117 is carried by a speed lever 121 which is pivotally connected to a rod member 123 in turn pivotally connected to one end of a speed reset lever 125. The other end of this lever 125 carries a cam follower 127 operatively engaging a speed reset cam 129 affixed to a throttle shaft 131 which may be directly linked to the throttle lever 31 (FIGURE 1).

Intermediate its ends the speed reset lever 125 bears against a pivot 133 affixed to a member 135 having also affixed thereto the stem element 137 of an acceleration signal valve assembly designated generally by reference numeral 136. This assembly comprises a valve seat 139 formed in a sleeve element slidable within a bore in the main fuel control housing and positioned therein by a threaded adjustment member 147 as shown. The pivot element 135 is urged in a direction to open the acceleration valve by a spring 141 compressed between it and the valve sleeve. Preferably the pivot element 135 is mounted as by means 143 permitting vertical adjustment of the pivot element for resetting engine maximum speed in the manner explained in the aforementioned Marscher application, the adjustment member 147 permitting reset of engine "idle" speed in a manner also analogous to that explained in the Marscher application.

The acceleration valve assembly 136 produces a control signal indicative of engine acceleration or other underspeed condition, by control of communication between the line 109 and drain. Such communication is afforded through the valve and ports 145 formed in the sleeve element thereof, whenever the valve stem 137 moves away from its seat 139. Before discussing the conditions under which such control signal is generated and the results thereof, operation of the parts of the engine main fuel control shown will first be summarized.

The push rod 119 which controls the engine main fuel metering valve is spring loaded by means (not shown) urging it in leftward direction into engagement with either or both the cam follower 115 and the speed lever 121 which carries cam follower 117, with the effect of such leftward movement being an increase of fuel flow to the engine main burners. Accordingly, push rod 119 will move leftwardly to increase fuel flow to the engine main burners until it reaches a position such as to engage one or the other of the cam follower members. The point at which engagement is made with cam follower 115 will depend solely upon engine speed as manifested by cam position; the point at which engagement is made with the speed lever 121 will depend both upon position of the cam and upon position of the speed reset rod lever 125, since movement of the latter is operative to shift the pivot point of the speed lever.

Disregarding for the moment the effect of movement of pivot element 133, it is apparent that rotation of throttle shaft 131 and of the speed reset cam 129 affixed thereto will rotate the speed reset lever 125 in a manner to shift the pivot point of speed lever 121. If the throttle shaft movement is in a direction to call for increased engine speed, the contour of reset cam 129 is such as to cause counterclockwise rotation of speed reset lever 125 thus causing translation of the pivot point of lever 121 towards the left. The speed lever 121 therefore will tend to pull away either from pushrod 119 or cam 113, or both, and assume a position as illustrated.

As engine speed increases, cam 113 translates towards the left and eventually will reach cam follower 117. Further translatory movement of the cam will rotate speed lever 121 in counterclockwise direction into engagement with pushrod 119, and as the engine reaches the speed called for this movement of speed lever 121 will shift the pushrod 119 towards the right in fuel flow decreasing direction. To do this, the speed lever 121 must exert a substantial force against the pushrod 119 since it is spring loaded towards the left, and the resultant reaction force accordingly is sufficient to act through rod 123, speed reset lever 125, pivot element 135 and valve stem 137 to close the valve orifice at 139. In this fashion, the end of the engine under-speed or acceleration condition, i.e., the attainment of the engine speed called for by the change in throttle lever setting, is signaled by closing of the acceleration valve 136.

Whenever the engine is operating substantially below the speed called for by the throttle lever setting, this condition will result in engagement of the acceleration limit cam follower 115 with cam 113, the cam being contoured to assure this. The speed lever 121 then separates either from push rod 119 or from cam 113, with consequent unloading of the valve 136 and opening movement thereof due to the action of spring 141. Such off-speed condition may exist either by reason of a change in throttle lever setting calling for increase in engine speed as just explained, or by reason of change in engine speed due to some other cause such as initiation of afterburner combustion with consequent increase of back pressure on the turbine and resultant decrease in turbine speed. Regardless of the cause, whenever the engine is operating substantially below the speed called for, pushrod 119 will come into engagement with the acceleration limit cam follower 115 and will unload the speed lever 121 and the acceleration valve 136 will open to indicate the underspeed condition.

Turning now to the effect which acceleration valve operation has upon the action of the lock-out valve assembly, it is apparent that if the acceleration valve is open then line 109 connects to drain and fluid pressure cannot build up in the end of cylinder 89 to cause movement of valve piston 87 towards the right. Under these conditions the fluid pressure supply to the cylinder bleeds off through groove 103, port 105, check valve 107, and the line 109 to drain. To assure that the flow resistance of this drain connection is not such that pressure build-up may occur in the lock out valve cylinder notwithstanding the open condition of acceleration valve 139, the fixed orifice 79 through which the servo fluid supply connects into the lock-out valve cylinder limits the rate of pressure fluid flow to the cylinder to a value sufficiently low that no pressure build up can occur except when the acceleration valve 136 is closed.

In the manner just explained, the lock-out valve assembly 71 operates to assure that the afterburner shut-off valve cannot be opened to initiate afterburner fuel flow whenever an engine off-speed condition exists. This assures that fuel flow to the engine afterburner cannot commence until such time as the engine has reached the speed level called for, which normally is maximum speed since afterburner fuel usually not called for until the throttle lever reaches a setting corresponding to maximum available "dry" engine thrust which of course calls for maximum speed.

It will be noted that the valve port 105 in the cylinder wall of lock-out valve assembly 71 is closed by the cooperating wall of the valve piston 87 as that piston moves towards the right to open the afterburner shut-off valve and initiate afterburner fuel flow. Therefore, whenever the lock-out valve piston 87 moves to the right to open the afterburner shut-off valve and initiate afterburner fuel flow, the valve port 105 is closed by the piston and once this occurs the valve piston 87 will be held in the position it then occupies, regardless of whether line 109 later is disconnected from drain by action of the acceleration valve 136. This is of advantage because initiation of afterburner operation frequently results in a momentary deceleration of the engine due to an increase of back pressure on the turbine caused by afterburner fuel combustion, and such engine deceleration may cause opening of the acceleration valve 136. If opening of this valve were now permitted to cut off afterburner fuel flow, this could give rise to an unstable condition under which the afterburner would cut itself on and off cyclically.

The control signal provided by acceleration valve 136 also assists in the control of engine nozzle area during off-speed conditions such as occur during engine acceleration. Before discussing the manner in which this control signal is introduced into the nozzle area control system, however, the general arrangement and construction of the nozzle area control will first be explained.

The engine nozzle actuators are directly controlled by a mechanical link 151 having pivotal connection to a crank element 153 affixed to a shaft 155 which is journaled for rotation in fixed bearing structure 157 as shown. Shaft 155 is rotated by a servo unit 159 including a power piston 161 linked to the shaft 155 by crank 163. This servo is of bleed type having a servo fluid supply through line 165 and including a fixed orifice 167 and variable orifice 169 with the area of the latter being controlled by a flapper element 171. The servo power piston 161 normally will follow movement of the flapper element 171, being compelled to do so by variation of the differential pressure across the piston. Such differential pressure variation is effected by variation of the relative open areas of the fixed orifice 167 and variable orifice 169, in the manner characteristic of bleed servos such as that shown.

Flapper element 171 is fixed to a shaft 173 which is journaled for rotation in a bearing 175 mounted in fixed housing structure. At its upper end, the flapper element 171 is provided with an adjustable cam follower 177 engaging one camming surface of a cam member 179 fixed to the throttle lever shaft 73. The cam follower is urged into engagement with cam 179 by a tension spring 181 linked to the flapper element so as to cause the cam follower to follow the contour of the cam unless it is prevented from doing so by one of the override inputs to the flapper element shaft 173, which overrides will be explained hereinafter.

In the absence of an override signal, the cam linkage between the throttle lever shaft 73 and flapper element 171 will position the servo power piston 161 and, through it, the nozzle actuator control rod 151, as a direct function of throttle lever position. The throttle cam 179 is contoured so as to provide optimum nozzle open area for engine operating conditions at each throttle lever setting.

Under certain conditions of operation of the engine, and particularly during operation of the afterburner, the maximum potential of the engine may be more fully realized if control of nozzle area is taken away from the throttle lever and the nozzle is instead placed under control of means responsive to turbine temperature. When operating in this mode, the nozzle area control positions the nozzle in a manner such as to hold turbine temperature constant at a value at or near the maximum permissible temperature level. This enables fuller realization of available thrust, and at the same time provides better correlation between operation of the nozzle area control and that of the afterburner fuel control than could be provided by the throttle lever alone.

To these ends, the shaft 173 carrying the nozzle servo flapper element 171 has affixed to it an abutment element 183 adapted to engage a pin 185 mounted to a lever 187. This lever is pivotally mounted to and has a lost motion connection as at 189 to a shaft 191 journaled for rotation in a bearing 193 mounted to fixed housing structure. Lost motion thus provided is normally taken up by a coil spring 195 having one of its ends fixed in shaft 191 and its other end engaging the lever 187, urging its rotation in clockwise direction to take up the lost motion in connection 189. The strength of this spring 195 is such that it normally holds the lever 187 and shaft 191 in the relative positions illustrated, so that the flapper shaft 173 is constrained to follow any clockwise rotation of shaft 191, with the cam follower 177 pulling away from cam 179 as necessary to permit such clockwise rotation of shaft 173 and the flapper element.

Shaft 191 has fixed to it a cam follower member 197 engaged by a cam 199 which is carried by the shaft 201 of an electrical servo motor driven by the temperature amplifier 53. As explained above in reference to FIGURE 1, the temperature amplifier 53 has as its input a temperature signal from thermocouple 51 mounted in the engine tailpipe just downstream of the turbine so as to be responsive to turbine exhaust gas temperature. With this arrangement, the servo motor 203 operates within limits imposed by stop elements 205 to position cam 199 as a direct function of turbine temperature. Should this temperature level exceed the design value, which normally is near the maximum safe temperature level which the engine can withstand, the resultant rotation of cam 199 will rotate lever 197 and the attached shaft 191 in clockwise direction. Shaft 191 will drive lever 187 through spring 195 to cause corresponding clockwise rotation of lever 183 and the shaft 173 carrying flapper element 171. The servo power piston 161 will follow the flapper element with resultant movement of lever 153 in the "nozzle open" direction indicated. As the nozzle opens, this reduces back pressure on the turbine with consequent reduction in turbine temperature.

Once the temperature limit mechanism just described has assumed control of nozzle area in the manner explained, it will continue to control opening and closing movement of the nozzle so as to hold turbine temperature at constant predetermined level. Of course, if turbine temperature falls to a value such that shaft 173 is permitted to rotate back to the point at which cam follower 177 again contacts the throttle cam 179, the throttle cam will again assume control and will control any further closing movement of the nozzle as a function of throttle lever position. In this way, control of engine nozzle position automatically may be taken over by whichever of the two inputs—namely, the throttle lever input through cam 179 and the temperature control input through servo motor 203—is calling for the more open nozzle position. This is desirable because the consequence of a nozzle setting more open than necessary is a reduction of realized thrust, whereas the consequence of too small a nozzle opening is a possible overtemperature of the engine with resultant serious damage to it.

As hereinbefore mentioned, however, the engine is not likely to run into temperature problems except during afterburner operation. Temperature control of nozzle area is therefore not essential except during afterburning operation, and it accordingly may be desirable to lock the temperature control input out of the system during non-afterburning or "dry" engine operation, or at least limit its control action. This assures that if during "dry" operation there is a failure of the temperature limit system or any of its components such as the temperature amplifier, the nozzle cannot be driven to full open position by the temperature limit mechanism. In other words, full open position of the nozzle is not required during dry operation of the engine, and to protect against the loss of engine thrust which would result from a temperature limit system failure driving the nozzle full open, the temperature limit system may if desired be disabled or limited in range of action except during afterburning operation.

To accomplish this, the valve piston 87 of afterburner lockout valve assembly 71 is provided with a stem 207 which extends outside the valve housing 89 and is connected to one end of a lever 209 pivotally mounted as at 211 to fixed housing structure as shown. The free end of this lever 209 is disposed in position to engage lever member 187 in the temperature limit system so as to limit clockwise rotation of lever 187 whenever the lockout valve piston 87 occupies the position shown, i.e., when it is in its non-afterburning or "dry" position. When afterburning operation is initiated by rotation of throttle lever 73, this causes the lock-out valve piston 87 to move to the right in the manner previously explained, and this movement rotates lever 209 in counterclockwise direction so as to remove its free end from engagement with lever 187. Thus, during afterburning operation, clockwise rotation of lever 187 is permitted and the temperature limit system may under these conditions assume control of nozzle area as explained above.

Desirably, the control of nozzle area may as hereinbefore mentioned be made subject to the control signal from the acceleration valve 136. To this end, the cylinder within which the nozzle servo piston 161 reciprocates is provided with a port 213 through the cylinder wall intermediate its ends. This port 213 is so disposed that it opens into the cylinder when the piston 161 moves to the right towards nozzle close position, but is closed off by the piston when moving towards the left-hand end of the cylinder. Port 123 communicates through a fixed orifice 215 with the line 109 which connects to the acceleration valve 136.

It will be recalled that the operation of acceleration valve 136 is such that line 109 connects to drain through valve 136 whenever an offspeed condition exists, i.e., whenever the engine is accelerating, and that whenever the engine reaches the called-for speed level then line 109 is closed to drain. It will also be recalled that the control inputs to the nozzle servo flapper element 171 are so arranged that this element always may move in nozzle opening direction, with cam follower 177 lifting from cam 179 and lever 183 separating from pin 185 if necessary to permit flapper movement in this direction.

Now if the nozzle servo piston 161 is at or near the righthand end of its travel for any reason, whether because of the throttle cam input or the temperature limit input, the generation of an off-speed signal by the acceleration valve 136 will operate to connect line 109 to drain. The fluid pressure equilibrium previously existing in nozzle servo 159 will now be disturbed, by virtue of the fact that the variable area orifice 169 now has in parallel with it a second flow path to drain through port 213 and line 109. Fluid pressure to the left of piston 161 accordingly will drop, and the piston will move towards the left to cause the nozzle to open. When the piston reaches the position illustrated, it will close off the port 213 and further movement of the nozzle servo piston will be halted unless such further movement is called for by one or another of the control inputs to the flapper element.

In this fashion the engine nozzle is made to move in opening direction, to a predetermined open position determined by the location of port 213 along the path of travel of servo piston 161, whenever the acceleration valve 136 senses an engine off-speed condition. Such automatic opening of the engine nozzle offers significant advantages during both afterburning and "dry" operating modes. During "dry" operation, the automatic opening of the nozzle whenever the control senses that the engine is underspeed and trying to accelerate, permits faster acceleration. This follows because opening the nozzle reduces back pressure on the turbine and thus allows the engine to accelerate more rapidly. Similarly, during afterburning operation there normally results some deceleration of the engine due to the rise in back pressure on the turbine caused by combustion of the afterburner fuel. Such engine deceleration causes the nozzle to open to minimize the back pressure increase and also minimize the time required to accelerate the engine back to the called for speed level.

Turning now to the manner in which afterburner fuel flow is metered, it was explained with reference to FIGURE 1 that fuel metering is accomplished by means 47 in response to a control signal from the afterburner fuel and nozzle area control. In FIGURE 2, the element which transmits this control signal to the fuel metering unit is a control rod 217 which is pivotally connected to the lower end of a lever member 219 carrying a cam follower element 221 adjacent its upper end. Cam follower 221 is urged toward engagement with a camming surface on the throttle lever cam 179 by the same spring 181 which loads the nozzle servo flapper element against the cam. Lever member 219 bears against a fixed pivot element 223 and operates to position the control rod 217 directly in accordance with throttle cam position, the throttle cam contour normally being cut so as to schedule increasing afterburner fuel with increasing throttle angle through the afterburner range.

Such throttle lever control is subject to two overrides. The first of these is under control of the turbine temperature limit mechanism and the nozzle servo flapper element positioned thereby. The afterburner fuel metering control rod 217 and flapper element 171 may interengage through an adjustable stop element 223 carried by the flapper element 171 in position to engage one end of a bellcrank member 225 the other end of which is pivotally connected to control rod 217 as shown. In operation of this override, the stop member 223 comes into contact with bellcrank 225 to cause decrease in afterburner fuel supply whenever the temperature limit servo motor 203 has driven the nozzle servo flapper element 171 to full nozzle open position and engine overtemperature still continues. Under such conditions, the servo motor 203 will continue to drive the nozzle flapper element 171 and the attached stop member 223 into engagement with bellcrank 225 to reduce the afterburner fuel supply as necessary to bring turbine temperature back down to the called-for value. Thus, the system operates to provide sequential limiting of nozzle area and afterburner fuel supply, with nozzle area being the primary control parameter and afterburner fuel supply as a secondary control parameter to which resort is had in event nozzle area control proves inadequate to limit turbine temperature for any reason.

An added safeguard may if desired be provided in the form of a nozzle position signal to the afterburner fuel metering control. As illustrated, this signal is provided by a shaft 227 mechanically linked to the engine nozzle elements so as to directly indicate the position thereof by rotation of shaft 227. A cam 229 fixed to this shaft engages the lever member 219 and operates to lift throttle cam follower 221 from the throttle cam 179 whenever the engine nozzle is not sufficiently open that the engine can safely accommodate the afterburner fuel supply which would otherwise be called for by the throttle lever cam 179. This serves the purpose of preventing supply of sufficient afterburner fuel to initiate afterburner combustion if for any reason the nozzle happens to be closed at a time when the throttle lever is calling for afterburner fuel supply. This feature also prevents afterburner fuel flow from ever getting too far out of line with nozzle area, and additionally operates to reduce afterburner fuel flow if the nozzle control should happen to fail in the nozzle closing direction during afterburning operation. This serves to minimize the otherwise serious overtemperature which would occur if full afterburner fuel supply were continued. During normal operation, however, this cam 229 is so contoured as to only just contact the follower member 219 and, under these conditions, the throttle cam 179 exercises controls through its follower 221.

Thus the afterburner fuel and nozzle area control system of FIGURE 2 supplies to the metering valve assembly 47 (FIGURE 1) a control signal operative to regulate the supply of afterburner fuel to the engine, and at the same time operates to control the shut-off valve in the inlet of the afterburner fuel pump 43 which supplies fuel to the metering valve assembly. Since during "dry" operation of the engine, this afterburner fuel pump normally still is connected to be driven by the engine, it is desirable to unload the pump by venting from the pumping chamber all fluid entrapped therein at the moment of closing of the shut-off valve 45. To this end, the check valve 57 preferably is provided with a bleed orifice 231 which connects through the check valve housing and a line 233 to the pump bearing sump at 235 and thence through a passage 237 formed in the pump housing to a point upstream of the shut-off valve.

Through these passages, any fuel contained in the pumping chamber at time of shut-down of the afterburner system may be pumped back to a point upstream of the shut-off valve and the pumping chamber thus voided of fuel. This reduces the power required to drive the pump during "dry" operation of the engine. During such operation, however, it is desirable to lubricate the pump shaft bearings and as shown this may be accomplished by a line 239 connecting through line 101 and line 69 to the servo fluid supply which, being tapped from the discharge of the engine main fuel pump, always will provide a supply of pressure fluid for lubricating the pump shaft whenever the engine is operating.

The operation of the afterburner fuel and nozzle area control will now be explained, with reference first to the non-afterburning or "dry" mode of operation. When the throttle lever 31 is at a setting calling for operation in this mode, throttle shaft 73 and the pilot valve 75 controlled thereby operate to connect the line 81 to afterburner lock-out valve 71 to drain through the pilot valve. The lock-out valve piston 87 is therefore urged to the left by spring 91, to the position illustrated.

With the lock-out valve piston 87 in this position, the afterburner fuel shut-off valve 45 is closed by reason of the connection of its pressure fluid supply line 67 to drain through port 93 in the lock-out valve assembly 71. There accordingly is no flow of fuel to the afterburner fuel pump 43 and no supply of fuel to the afterburner.

The lock-out valve piston 87 in the position it now occupies holds the temperature limit disabling lever 209 in position such that its free end may engage lever 187 and, through its lost motion connection at 189, limit clockwise movement of the lever responsive to turbine temperature rise. This limitation on movement of lever 187 acts either to disable its control function completely or at least to limit the range through which it may drive the nozzle servo in nozzle opening direction. The temperature limit mechanism is thus limited in action during "dry" operation to assure against its driving the nozzle full open in event of failure. Nozzle area now is scheduled simply as a function of throttle lever position and of the contour of the throttle cam 179 against which the nozzle servo flapper element engages.

If the operator now advances the throttle lever to call for increase in engine speed, the resultant rotation of the throttle lever input 131 to the engine main fuel control 33 will cause counterclockwise rotation of the speed reset lever 125 with consequent translatory movement of the pivot point of speed lever 121 in leftward direction. Pushrod 119 will therefore move towards the left into engagement with the acceleration limit lever 115, halting further leftward movement of the pushrod 119 until engine speed increases to a level such that it can safely accommodate the fuel increase called for. Speed lever 121 will thus be unloaded from pushrod 119, and spring 141 thereupon will urge pivot element 135 towards the right, causing opening of the acceleration valve 136 to indicate an "off-speed" condition.

This will connect line 109 to drain through the acceleration valve 136. If the nozzle servo piston 161 now occupies a position such that the engine nozzle is open, i.e., the servo piston occupies a position in which it covers port 213, the opening of the acceleration valve 136 will have no effect upon operation of the servo. However, if the engine nozzle is in relatively closed position, i.e., the servo piston 161 is toward the righthand end of its travel, port 213 will now be open to drain through line 109 and acceleration valve 136. There accordingly will result a reduction in fluid pressure to the left of servo piston 161 and the piston will translate towards the left and move to a position such that it just covers the port 213. In this fashion, the nozzle servo piston and the nozzle itself both move automatically towards nozzle open position whenever an under-speed condition exists, thus facilitating acceleration of the engine to correct the under-speed.

Now if the operator advances throttle lever 31 into the after-burning range, the pilot valve 75 will be rotated by throttle shaft 73 to a position such that the pilot valve directly interconnects lines 77 and 81, to thus duct servo pressure fluid to the lock-out valve assembly 71. If such throttle lever advancement was from a point below the maximum speed level of the engine, an engine speed increase also will be called for by the throttle lever input to the main fuel control through shaft 131 and speed reset cam 129. The main fuel control accordingly will sense an underspeed condition and acceleration valve 136 will open, venting line 109 to drain. The pressure fluid supply to lock-out valve 71 through line 81 accordingly will be connected to drain through port 105, check valve 107 and line 109 to the acceleration valve and thence to drain. Under these conditions there can be no build-up of pressure to the left of the lock-out valve piston 87, and the piston accordingly will remain in the position shown until such time as engine speed has increased to the level called for, at which time the acceleration valve 136 will close and thus close off the connection of line 109 to drain.

When this occurs, the lock-out valve piston 87 will translate to the right, to connect the shut-off valve control line 67 to the servo fluid supply 69 through line 101 and port 97 in the lock-out valve cylinder 80. The resultant application of pressure to the upper side of shut-off valve piston 63 will cause that piston to move downwardly to open the shut-off valve. Fuel pump 55 thereupon will commence to supply fuel to the afterburner through line 59.

As the lock-out valve piston 87 moves to the right, it rotates lever 209 in counterclockwise direction to remove the free end of that lever from engagement with the temperature limit lever 187, allowing the temperature limit mechanism to assume control of engine nozzle area whenever turbine temperature reaches a level such as to require a more open setting of the engine nozzle than would be afforded by the throttle cam 179 and its input to the nozzle servo.

In event turbine temperature continues to increase or remains above the maximum safe level after the temperature limit mechanism and the nozzle servo controlled thereby have moved the engine nozzle to full open position, the continued rotation of nozzle servo flapper element 171 by the temperature limit mechanism will bring the flapper element into contact with the bellcrank 225 which connects to the afterburner fuel metering valve through rod 217. The temperature limit mechanism then acts through this connection to cut back on afterburner fuel supply as necessary to bring turbine temperature back down to safe level.

At the moment of initiation of fuel supply to the engine afterburner, the combustion of this fuel in the engine tailcone normally will result in an increase in gas pressure in the tailcone, and this increase of back pressure on the turbine may cause the engine to decelerate. Such engine deceleration constitutes an off speed condition which the main fuel control will sense and will indicate by opening the acceleration valve 136. When this occurs with the nozzle in relatively closed position, then the venting of the nozzle servo 159 through port 213, line 109 and acceleration valve 135 to drain, will cause the nozzle servo to translate towards the left to open the nozzle in precisely the same fashion as previously explained with reference to operation in the "dry" or non-afterburning regime. Such nozzle opening action is of advantage both for the reason that it enables faster acceleration of the engine due to reduction in back pressure on the turbine, and also in that it assists in limiting any overtemperature which might otherwise occur by reason of afterburner fuel combustion at relatively closed nozzle setting.

To further assure against such contingency, the nozzle position signal transmitted by rod 227 and cam 229 to the afterburner fuel supply control rod 217 may override the afterburner fuel setting called for by throttle cam 179 and prevent or limit the supply of afterburner fuel until such time as the nozzle position signal cam 229 indicates that the nozzle has reached a sufficiently open position that afterburner fuel can safely be supplied without risk of engine overtemperature.

In this way, the various overrides and safety features incorporated within the afterburner fuel and nozzle area control system of the invention provide safeguards against engine overtemperature under all operating conditions of the engine and even notwithstanding a failure of one of the control sub-systems. At the same time, the control operates to optimize engine responsiveness to changes in throttle lever setting by adjusting the engine nozzle area in a manner to expedite the change in operating conditions called for by the throttle lever.

While only one embodiment of the invention has been described and illustrated by way of example in the foregoing, many modifications will occur to those skilled in the art and it therefore would be understood that the appended claims are intended to cover all such modifications as fall within the true spirit and scope of the invention.

What is claimed as new and desired to be secured by Letters Patent of the United States is:

1. For use with a throttle lever controlled turbojet engine including afterburner and variable area nozzle, an afterburner and nozzle area control system comprising nozzle servo means including a control input member, means operatively interconnecting said control input member to said throttle lever so as to control said nozzle servo in accordance with throttle lever position, means responsive to an engine operating temperature, lost motion means normally operatively interconnecting said temperature responsive means to said nozzle servo to enable override of the throttle lever control thereof in nozzle opening direction when said temperature reaches a predetermined value and to then control nozzle area so as to hold said predetermined temperature value, afterburner control means including a control member movable from a first to a second position and operative to initiate afterburner operation by such movement, and means coupling said afterburner control member through said lost motion means to said temperature responsive means to limit the range of override action thereof except during afterburner operation.

2. For use with a throttle lever controlled turbojet engine including afterburner and variable area nozzle, an afterburner and nozzle area control system comprising first nozzle area control means operative to schedule nozzle area as a function of throttle lever position, second nozzle area control means responsive to an engine operating temperature and operatively interconnected with said first means to override the same in nozzle opening direction and assume control of nozzle area when said temperature reaches a predetermined value to then control nozzle area so as to hold said predetermined temperature value, limit means selectively operable to limit the range of nozzle control action of said second nozzle area control means in nozzle opening direction, means operable to control afterburner operation by control of fuel supply thereto, and means responsive to operation of said last-named means to disable said limit means during afterburner operation.

References Cited in the file of this patent

UNITED STATES PATENTS

| | | |
|---|---|---|
| 2,674,843 | Lombard | Apr. 13, 1954 |
| 2,706,383 | Jacobson | Apr. 19, 1955 |
| 2,972,858 | Pavlick | Feb. 28, 1961 |
| 2,987,876 | Williams | June 13, 1961 |

OTHER REFERENCES

"The Control of Turbojet Engines," by Donald F. Winters, Aeronautical Engineering Review, June 1955, pages 62–65 and 71.